E. P. FOWLER.

FOLDING SPRING BED BOTTOM.

No. 9,886. Reissued Oct. 4, 1881.

Witnesses:

Alex. Thain

Robt. H. Duncan

Inventor:

Edwin P. Fowler by his Attorney,

Saml. A. Duncan

UNITED STATES PATENT OFFICE.

EDWIN P. FOWLER, OF BROOKLYN, NEW YORK.

FOLDING SPRING BED-BOTTOM.

SPECIFICATION forming part of Reissued Letters Patent No. 9,886, dated October 4, 1881.

Original No. 162,639, dated April 27, 1875. Application for reissue filed August 18, 1881.

*To all whom it may concern:*

Be it known that I, EDWIN P. FOWLER, of Brooklyn, in the county of Kings and State of New York, have invented certain new and useful Improvements in Spring Bed-Bottoms; and I do hereby declare that the following is a full, clear, and exact description thereof, reference being had to the accompanying drawings and the letters of reference marked thereon, which form part of this specification.

The nature of my invention consists in the construction and arrangement of the parts composing a spring bed-bottom, as hereinafter set forth, by which it can be readily rolled into a compact and convenient form for transportation or storage.

In order to enable others skilled in the art to which my invention appertains to make and use the same, I will now proceed to describe its construction and operation, referring to the annexed drawings, in which—

Figure 1:
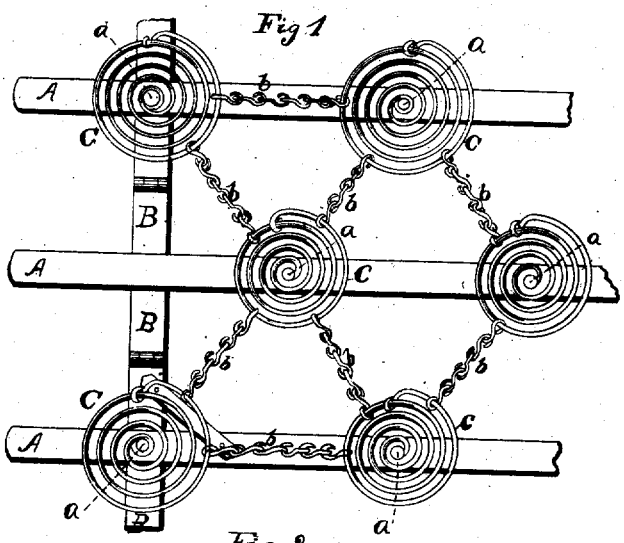
Figure 2:
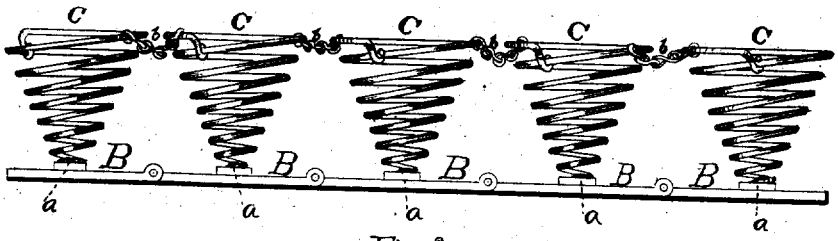
Figure 3:
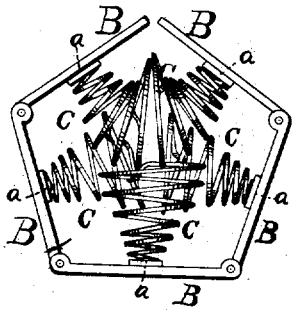

Figure 1 is a plan view of a section of the bed-bottom. Fig. 2 is an end view of the bed-bottom when arranged for use, and Fig. 3 is an end view of the same when rolled up.

A A represent a series of bars or slats, of suitable material and dimensions to form the supports for the springs. Each of the bars A is, at a suitable distance from each end, provided with a cross-bar, B, firmly fastened thereto and projecting equally on both sides thereof. The ends of these cross-bars B B are formed into or provided with hinge-butts, and are hinged together, as shown, thereby uniting or connecting the bars or slats A A parallel with each other, and forming a folding or rolling frame. On the upper sides of the bars or slats A A, at suitable intervals, are fastened headed pins or rivets *a a*, which are arranged alternately; or, in other words, the pins on one bar are opposite the middle of the spaces between the pins on the adjoining bar, and so on throughout the entire series. On or to each pin *a* is secured the lower small end of a spiral spring, C, and the upper larger ends of these springs are connected together by means of metal chains *b b*, preferably made of round wire and loosely linked around the upper coil of the springs. The springs C C are thus arranged alternately—that is, those on one slat are opposite the spaces between those on the next slat. This alternate arrangement of the springs provides a bed-bottom with sufficient spring-surface to keep the mattress or bed in place—that is, from sinking too much between the springs—and at the same time permits it to be rolled up into a smaller compass than would be practicable were the same number of springs of the same size otherwise arranged. It is readily seen that in rolling up this bed-bottom the upper and larger ends of the springs arranged upon one of the outer slats or bars, A, where the rolling commences, enter into the spaces between the springs arranged upon the next slat or bar, and so on throughout the series, as the rolling is continued, until the bed-bottom is brought into substantially the form shown in Fig. 3 of the drawings.

The connecting-chains *b b*, used for connecting the upper ends of the springs, possess peculiar advantages over cords and straps of cloth and leather, especially in the following particular: As the bed-bottom is rolled up the springs are liable to be forced against the connecting cords, straps, or chains, and cause them to be moved from their normal positions on the springs. When this takes place with the cord or strap connections, instead of returning readily and quickly to their normal positions, they are extremely liable to bind or cling to the springs, and thus prevent the bed-bottom from being opened or unrolled to its full extent. This difficulty is entirely remedied by the use of the wire chains *b b*, which slide easily upon the upper coils of the springs, and thus are with certainty and at once restored to their position by the unrolling of the bed-bottom.

What is claimed as new is—

1. In a bed-bottom constructed to be rolled up, the alternate arrangement of spiral springs, substantially as and for the purpose set forth.

2. The combination, in a bed-bottom constructed to be rolled up, of spiral springs C C and connecting metal chains *b b*, substantially as and for the purpose described.

3. The bed-bottom composed of the metal bars B, having their ends formed into hinge-butts, which are connected by a wire, the slats A, attached directly to the center of each bar B, and having the spiral springs C C, arranged in alternate order and coupled together by metal chains *b b*, all as and for the purpose set forth.

EDWIN P. FOWLER.

Witnesses:

WM. W. LADD, Jr.,

SAML. H. MILLS, Jr.